United States Patent
Gourves

(10) Patent No.: US 9,556,865 B2
(45) Date of Patent: Jan. 31, 2017

(54) METHOD FOR CONTROLLING A REFILLING MOTOR THAT DRIVES A HYDRAULIC PUMP

(75) Inventor: Frederic Gourves, Courdimanche (FR)

(73) Assignee: TECHNOBOOST, Paris (FR)

( * ) Notice: Subject to any disclaimer, the term of this patent is extended or adjusted under 35 U.S.C. 154(b) by 824 days.

(21) Appl. No.: 13/981,069

(22) PCT Filed: Dec. 20, 2011

(86) PCT No.: PCT/FR2011/053109
§ 371 (c)(1),
(2), (4) Date: Jul. 22, 2013

(87) PCT Pub. No.: WO2012/101340
PCT Pub. Date: Aug. 2, 2012

(65) Prior Publication Data
US 2013/0294929 A1    Nov. 7, 2013

(30) Foreign Application Priority Data

Jan. 27, 2011    (FR) ...................................... 11 50633

(51) Int. Cl.
*F04B 49/00*    (2006.01)
*F04B 49/02*    (2006.01)
(Continued)

(52) U.S. Cl.
CPC ............... *F04B 49/002* (2013.01); *B60K 6/12* (2013.01); *B60W 10/06* (2013.01); *B60W 20/00* (2013.01);
(Continued)

(58) Field of Classification Search
CPC ... F04B 49/02; F04B 49/022; F04B 2205/063; B60K 6/12; B60K 2006/123; B60K 2006/126; Y10T 10/6208
USPC ..................................................... 60/415, 418
See application file for complete search history.

(56) References Cited

U.S. PATENT DOCUMENTS 1,785,980 A * 12/1930 Sanford .................... F04B 9/02
                                                           417/12
4,064,694 A    12/1977 Baudoin
(Continued)

FOREIGN PATENT DOCUMENTS

FR    2330889 A1    6/1977
FR    2947304 A1    12/2010
(Continued)

OTHER PUBLICATIONS

International Search Report for corresponding International Application No. PCT/FR2011/053109, dated Jul. 9, 2012.

*Primary Examiner* — Charles Freay
*Assistant Examiner* — Christopher Bobish
(74) *Attorney, Agent, or Firm* — Polster, Lieder, Woodruff & Lucchesi LC

(57) ABSTRACT

Method for controlling a refilling motor (2) that drives a hydraulic pump (4) that refills at least one pressure accumulator (8), this accumulator thereafter delivering the hydraulic pressure (P) to a hydraulic traction machine (20) of a hybrid vehicle, characterized in that it takes account both of the rate of discharge of the pressure accumulator (8) and of the time to start ($\Delta i$) the refilling motor (2) so as to manage this start in such a way that this accumulator more or less reaches its minimum operating pressure level (PI) at the end of this start (t1).

9 Claims, 2 Drawing Sheets

(51) Int. Cl.
*B60K 6/12* (2006.01)
*B60W 10/06* (2006.01)
*B60W 20/00* (2016.01)
*B60W 30/192* (2012.01)
*F16H 61/4096* (2010.01)
*F16H 61/4148* (2010.01)

(52) U.S. Cl.
CPC ............ *B60W 30/192* (2013.01); *F04B 49/02* (2013.01); *F04B 49/022* (2013.01); *F16H 61/4096* (2013.01); *F16H 61/4148* (2013.01); *B60K 2006/126* (2013.01); *F04B 2205/063* (2013.01); *Y02T 10/6208* (2013.01); *Y02T 10/6282* (2013.01)

(56) References Cited

U.S. PATENT DOCUMENTS

| | | | | |
|---|---|---|---|---|
| 4,242,922 A | * | 1/1981 | Baudoin | B60K 6/12 180/165 |
| 4,372,414 A | * | 2/1983 | Anderson | B60K 6/12 180/165 |
| 4,382,484 A | * | 5/1983 | Anderson | B60K 6/12 138/30 |
| 4,387,783 A | * | 6/1983 | Carman | B60K 6/12 180/165 |
| 4,441,573 A | * | 4/1984 | Carman | B60K 6/12 180/165 |
| 5,317,870 A | * | 6/1994 | Inagawa | B60T 8/4009 60/418 |
| 7,722,331 B2 | * | 5/2010 | Hirasawa | F04B 41/02 417/44.2 |
| 8,239,110 B2 | * | 8/2012 | Kaltenbach | B60K 6/48 303/114.3 |

FOREIGN PATENT DOCUMENTS

| | | |
|---|---|---|
| WO | 98/54450 A1 | 12/1998 |
| WO | 2008/049064 A2 | 4/2008 |

* cited by examiner

METHOD FOR CONTROLLING A REFILLING MOTOR THAT DRIVES A HYDRAULIC PUMP

CROSS-REFERENCE TO RELATED APPLICATIONS

This application is the US National Stage under 35 U.S.C. §371 of International Application Number PCT/FR2011/053109 filed on Dec. 20, 2011 which claims priority to French Application No. 1150633 which was filed on Jan. 27, 2011.

BACKGROUND

The present invention relates to a method for controlling a refilling motor of a power train of a hybrid vehicle, which includes a pressure accumulator which supplies a hydraulic power machine. It also relates to a power train and an automobile that implements this control method.

Certain types of hybrid vehicles have a power train which includes an internal combustion engine delivering mechanical energy which drives a hydraulic pump in order to refill hydraulic pressure accumulators for storing this energy.

These vehicles moreover have a hydraulic machine connected to driving wheels, which can function either as a motor in order to deliver mechanical power to the driving wheels by taking stored energy from the pressure accumulators, or as a pump in order to fill these accumulators by braking the vehicle in such a way as to recover the kinetic energy of the vehicle. The stored energy is subsequently restored to the hydraulic machine functioning as motor, for powering the vehicle.

The hydraulic machine generally has a variable displacement, in order to adjust the levels of torque and power that are delivered or absorbed.

This use of stored hydraulic energy makes it possible to optimize the functioning of the internal combustion engine and to reduce its fuel consumption as well as its emission of polluting gases. The storage of hydraulic energy moreover enables one to run in hydraulic mode with zero emission, "ZEV", with the internal combustion engine remaining at a stop.

As a variant, the hybrid vehicle can have an electric motor that drives the pump for refilling the pressure accumulators, in order to store hydraulic energy coming from an electrical energy source in these accumulators.

A known method, presented in particular by the document WO-A1-9854450, describes a management of the power train in order to maintain approximately constant pressures in the hydraulic accumulators.

However, in order to optimize the functioning of the power train, one generally seeks to make the best possible use of the pressure accumulators by using a large quantity of energy in each cycle, by raising the pressure to the maximum threshold and then emptying them to a minimum threshold in order to delay the start-ups of the refilling motor and to space out these start-ups.

A problem arising then is the optimization of the instant of restarting of the motor, taking into account the time necessary for its start-up, and without risking a lack of pressure in the hydraulic accumulator which would lead to a loss of power on the driving wheels of the vehicle

BRIEF SUMMARY

The present invention aims in particular to prevent these disadvantages of the prior art by proposing a control method that allows the best possible management of engine start-up recharging.

For this purpose, a method is disclosed for controlling a refilling motor that drives a hydraulic pump that refills at least one pressure accumulator, which, in turn, delivers hydraulic pressure to a hydraulic power machine of a hybrid vehicle, characterized in that the method takes into account both the rate of discharge of the pressure accumulator and the start-up time of the refilling motor in order to manage this start-up in such a way that this accumulator reaches approximately its minimum operating pressure level at the end of this start-up.

An advantage of this control method is that, by taking into account the rate of discharge, the method can optimize the instant of start-up of the refilling motor by starting it as late as possible, which enables one to use a larger reserve of energy stored in the pressure accumulator and to optimize the functioning of the drive train.

The control method moreover can have one or more of the following characteristics which can be combined with one another.

According to one embodiment, the control method computes an available energy level contained in the pressure accumulator from the continually measured pressure in this accumulator and from the minimum operating pressure level, and compares this available energy level with the hydraulic power consumed by the hydraulic power machine in order to determine a pressure corresponding to the start-up of the refilling motor.

Advantageously, the consumed power is computed by measuring the variation of pressure of the accumulator over time.

Advantageously, for an accumulator containing a pressurized gas, the minimum pressure level of the accumulator is greater than the residual gas pressure corresponding to complete discharging of the fluid pressure in the hydraulic circuit.

The invention also relates to a power train for a hybrid vehicle, having a refilling motor that drives a hydraulic pump in order to refill at least one pressure accumulator which supplies a hydraulic power machine of this vehicle, characterized in that the vehicle has a computation means which computes an available energy level contained in the pressure accumulator from the continually measured pressure in this accumulator and from the minimum operating pressure level, and a comparison means which compares this available energy level with the hydraulic power consumed by the hydraulic power machine in order to determine a pressure corresponding to the start-up of the refilling motor.

Advantageously, the pump and the hydraulic machine have variable displacements.

In a particular application, the refilling motor is an internal combustion engine.

Advantageously, the accumulator contains a pressurized gas.

The invention further relates to a hybrid vehicle having a power train with any one of the preceding characteristics.

DESCRIPTION OF THE FIGURES

The invention will be better understood and other characteristics and advantages will appear more clearly upon reading of the description below given as an example and in a non-limiting manner, in reference to the appended drawings in which.

DETAILED DESCRIPTION

Figure 1:
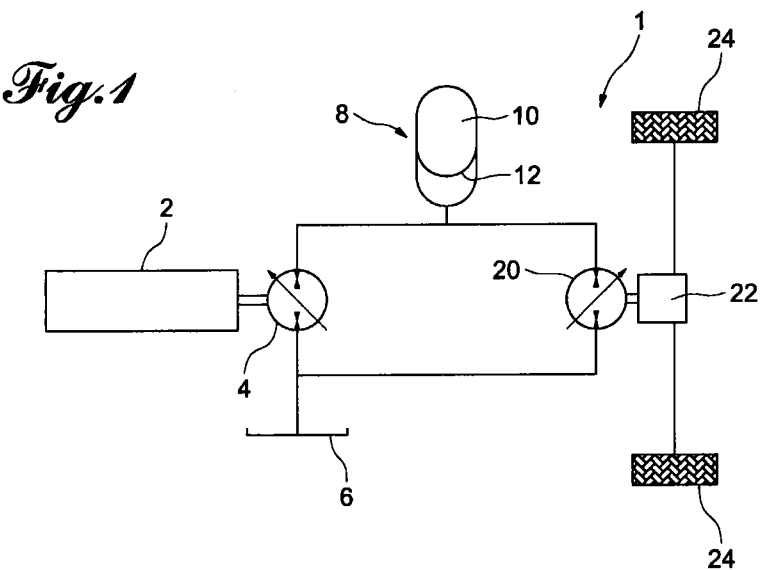
FIG. 1 is a diagram of a power train that implements the control method according to the invention.

FIG. 1 presents a power train 1 of a vehicle which includes an internal combustion engine 2 which drives a variable displacement pump 4. The variable displacement pump 4 pumps the hydraulic fluid from a tank 6 in order to fill a pressure accumulator 8.

The pressure accumulator 8 has a flexible membrane 12 separating a pressurized gas 10 generally containing nitrogen from the fluid which is maintained continually at a pressure approximately equivalent to that of the gas.

The pressurized fluid is then used by a variable displacement hydraulic machine 20 operating as motor, which is connected to a differential 22, and which drives the two driving wheels 24 of a given axle of the vehicle, distributing the power between these wheels. In contrast, during braking of the vehicle, the driving wheels 24 can drive the hydraulic machine 20 operating as pump, in order to refill the pressure accumulator 8 and thus to recover kinetic energy of the vehicle during the braking phases or when going downhill.

In order to optimize the functioning of the internal combustion engine 2, particularly in order to reduce the number of start-ups of this engine, and to deliver high power during its periods of operation, one seeks to store the largest possible quantity of energy in the pressure accumulator 8 and to use the largest possible quantity of energy in a single time.

It should be noted that in the case of an electric motor instead of the internal combustion engine, reducing the frequency of start-ups of this electric motor can be sought as well, particularly in order to reduce the number of start-ups leading to current consumption peaks.

Figure 2:
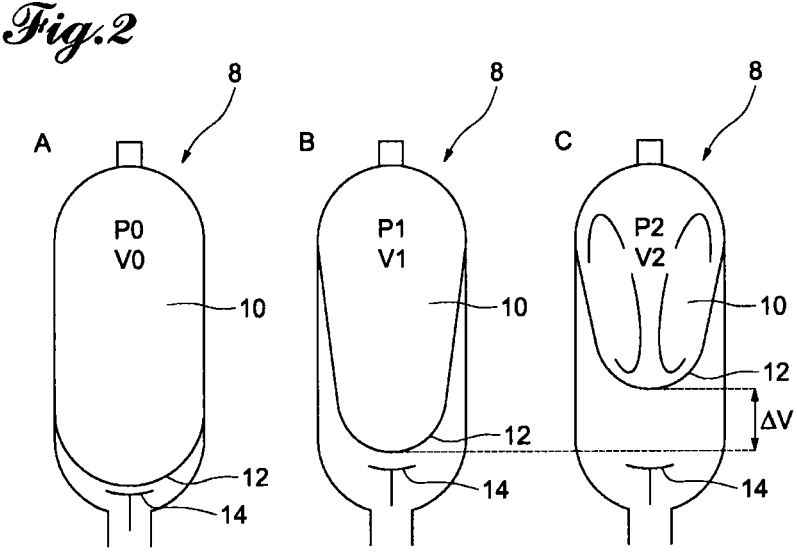
FIG. 2 presents three views in axial section of a hydraulic accumulator of this power train, successively including three filling levels A, B and C.

FIG. 2 presents a hydraulic pressure accumulator 8 which, in a first case A, is completely discharged, the hydraulic pressure circuit being, for example, open and put directly in connection with the tank 6.

In this case, the gas 10 maximally expands, and the membrane 12 descends until coming in contact with a lower stop 14 which limits the expansion of the membrane and beyond which the membrane cannot expand. The internal pressure of the gas 10 is then the residual pressure P0, and its maximum volume V0 represents the nitrogen capacity of this accumulator 8.

In a second case B, the pressure accumulator 8 is slightly filled by the pressure of the fluid, the membrane 12 being in its low operating position, which gives a minimum pressure threshold P1 of the gas 10, and a maximum operating volume V1 of this gas.

The low operating position of the membrane 12 is the lowest that is continually acceptable without risk of deterioration of the membrane, in order to guarantee the reliability of the accumulator 8. The minimum operating pressure of the hydraulic circuit is therefore approximately equal to P1.

In a third case C, the pressure accumulator 8 is highly filled by the pressure of the fluid, the membrane 12 being in its maximum high operating position, which gives a maximum pressure P2 in the gas 10, and a minimum volume V2 of this gas.

The gas 10 then undergoes, between these two volumes, maximum volume V1 and minimum volume V2, a volume difference $\Delta V$ which, multiplied by the corresponding pressure, represents stored energy that can be restored.

In practice, the pressure of the gas 10 should oscillate between its minimum value P1 and its maximum value P2, going if possible from one extreme value to the other during operation of a cycle of refilling and discharging of the pressure accumulator 8, in such a way as to store and then use in a single time the greatest possible quantity of energy.

Figure 3:
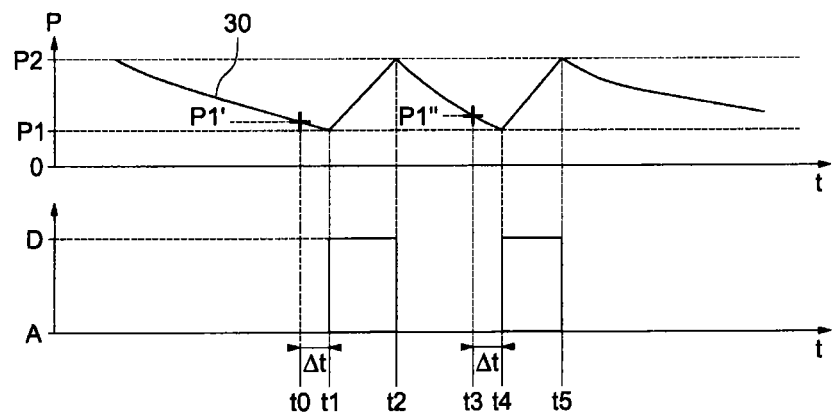
FIG. 3 is a time-based graph presenting the start-ups of the refilling motor.

The graph of FIG. 3 presents, as a function of time t, in its upper part, the change 30 of the pressure P of gas in the pressure accumulator 8, and in its lower part, the start-ups of the internal combustion engine 2, noted A for stop and D for start-up.

With the accumulator 8 filled initially to its maximum pressure P2, it is discharged regularly during powering of the vehicle driven by the hydraulic machine 20 which is used as a pump. The internal combustion engine is at a stop A.

A computer for management of the power train 1, that implements the control method, measures both the pressure P in the pressure accumulator 8 and its pressure variation over time or rate of discharge dP/dt, which is connected with the use of the fluid by the hydraulic machine 20 leading to a flow of this fluid.

It should be noted that the fluid flow varies particularly as a function of the pressure P in the accumulator 8, of the adjustment of the displacement of the hydraulic machine 20, of the speed of the vehicle, of the torque on the driving wheels requested by the driver, and of the resisting torque due to the running conditions. The management computer must continually check the rate of discharge dP/dt of the accumulator 8, which can change.

At time t0, the pressure being P1' slightly greater than P1, the method detects that, with the current rate of discharge dP/dt of the accumulator 8, its pressure will reach the minimum threshold P1 at time t1 corresponding to the end of the start-up D of the internal combustion engine 2, the pump 4 beginning in effect to refill the accumulator. The time difference $\Delta t$ between times t0 and t1 corresponds to the time necessary for the start-up of this internal combustion engine 2.

Starting from the time t1 when the pressure has descended to the minimum pressure threshold P1, there is then a rise again of the pressure up to the maximum pressure P2, corresponding to time t2 when the internal combustion engine will again be at a stop A.

The discharging of the pressure accumulator 8 can then begin again with, for the next cycle, an identical time difference $\Delta t$ between times t3 and t4, but with a start of time t3 corresponding to a pressure P1" greater than P1', because in this case, the lowering of pressure with respect to time dP/dt is greater than the preceding one, the hydraulic machine 20 consuming more fluid flow.

Figure 4:
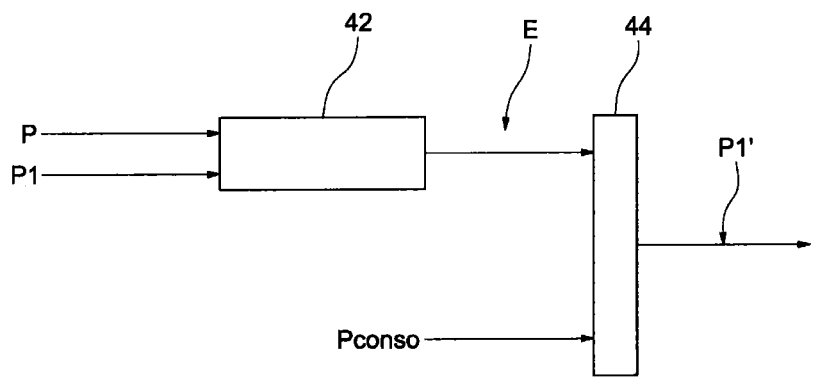
FIG. 4 is a block diagram of the control method.

The block diagram of FIG. 4 presents a means for implementation of the control method.

A controller or computation means 42 computes, from the continually measured pressure P in the accumulator 8, and from the minimum threshold pressure P1 recorded in memory, the available energy level E contained in this accumulator.

Then a comparator 44 compares the available energy level E in the accumulator 8 with the power consumed Pconso by the hydraulic machine 20 at that time, which represents a variation of energy E in time, in order to determine the start-up pressure P1' that will trigger the start-up of the internal combustion engine 2. It is thus ensured that, taking into account the power consumed Pconso, the time difference Δt necessary for the start-up of the internal combustion engine 2, which is recorded in memory, is complied with.

An optimization of the functioning of the power train 1 is thus achieved in a simple, robust and effective manner. Moreover, by integrating the control method in the management computer for the power train 1, and by using existing sensors, particularly for the measurement of the pressure of the fluid, this method can be carried out economically.

As a variant, a similar method for controlling can be used for the management of the start-up of the internal combustion engine 2, in order to refill several pressure accumulators connected in parallel.

The invention claimed is:

1. A method for controlling the starting of a refilling motor of a hydraulic traction drive; the hydraulic traction drive comprising said refilling motor, at least one pressure accumulator, and a hydraulic pump; a said hydraulic pump being in fluid communication with the pressure accumulator, and said refilling motor being operatively connected to the hydraulic pump to drive the hydraulic pump in order to refill the at least one pressure accumulator; the at least one pressure accumulator delivering the hydraulic pressure to a hydraulic power machine of a hybrid vehicle, the at least one pressure accumulator varying between a minimum operating pressure (P1) and a maximum pressure (P2); the method comprising:
monitoring the rate of discharge of pressure from the pressure accumulator (dP/dt);
determining a start-up pressure (P1'); said start-up pressure being greater than the minimum operating pressure (P1) and being the pressure of the at least one pressure accumulator at a time t1−Δt, wherein t1 is the calculated start-up time at which the pressure in the accumulator will be at said minimum operating pressure (P1) and Δt is the time required to start the refilling motor; whereby, said start-up pressure (P1') is determined as a function of dP/dt and Δt; and
starting the refilling motor when the pressure in the accumulator drops to the start-up pressure (P1'), such that when the pressure accumulator reaches approximately its minimum operating pressure level (P1) at the end of the start-up time (t1), the refilling motor will be started and ready to begin recharging the at least one pressure accumulator.

2. The control method according to claim 1, including a step of computing an available energy level contained in the pressure accumulator from the continually measured pressure in the pressure accumulator and from the minimum operating pressure level (P1), and a step of comparing the available energy level with the hydraulic power consumed by the hydraulic power machine in order to determine the start-up pressure corresponding to the start-up of the refilling motor.

3. The control method according to claim 2, wherein the power consumed is computed by measuring the variation of pressure of the accumulator with respect to time (dP/dt).

4. The control method according to claim 1, wherein, for an accumulator containing a pressurized gas, the minimum pressure level (P1) of the accumulator is greater than the residual gas pressure (P0) corresponding to complete discharging of the fluid pressure in the hydraulic circuit.

5. A power train for a hybrid vehicle which includes a refilling motor that drives a hydraulic pump in fluid communication with at least one pressure accumulator in order to refill the at least one pressure accumulator;
said at least one pressure accumulator supplying power to a hydraulic power machine of this vehicle; wherein the vehicle includes a controller which computes an available energy level (E) contained in the pressure accumulator as a function of the continually measured pressure (P) in this accumulator and the minimum operating pressure (P1), and a comparator which compares the available energy level (E) with the hydraulic power consumed (Pconso) by the hydraulic power machine in order to determine a start-up pressure (P1') of the pressure accumulator corresponding pressure of the pressure accumulator at a period of time Δt before the time t1 when, based on the power consumption, the pressure accumulator is estimated to reach said minimum operating pressure P1; wherein t1 is the calculated start-up time at which the pressure in the accumulator will be said minimum operating pressure (P1) and Δt is the time required to start the refilling motor; and said controller being operable to start the refilling motor when the pressure in the pressure accumulator reaches the start-up pressure (P1') such that the refilling motor will be started and ready to begin recharging the pressure accumulator when the pressure in the accumulator reaches the minimum operating pressure P1 at time t1.

6. The power train according to claim 5 wherein the pump and the hydraulic machine have variable displacements.

7. The power train according to claim 5 wherein the refilling motor is an internal combustion engine.

8. The power train according to claim 5 wherein the accumulator contains a pressurized gas.

9. A hybrid vehicle having a power train according to claim 5.

* * * * *